(12) United States Patent
Deng et al.

(10) Patent No.: US 8,427,085 B2
(45) Date of Patent: Apr. 23, 2013

(54) SPEED ADJUSTMENT CIRCUIT FOR A PLURALITY OF FANS

(75) Inventors: Bo Deng, Shenzhen (CN); Xian-Guang Tan, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 329 days.

(21) Appl. No.: 13/007,689

(22) Filed: Jan. 17, 2011

(65) Prior Publication Data
US 2012/0133317 A1  May 31, 2012

(30) Foreign Application Priority Data
Nov. 25, 2010  (CN) .......................... 2010 1 0559068

(51) Int. Cl.
*H02P 1/00* (2006.01)
(52) U.S. Cl.
USPC ........................... 318/268; 318/473; 318/471

(58) Field of Classification Search .................. 318/268, 318/504, 473, 471, 738, 503, 608; 388/815, 388/811
See application file for complete search history.

(56) References Cited

U.S. PATENT DOCUMENTS
2009/0169188 A1*  7/2009  Huang et al. .................. 388/811

* cited by examiner

*Primary Examiner* — Karen Masih
(74) *Attorney, Agent, or Firm* — Altis Law Group, Inc.

(57) ABSTRACT

A speed adjustment circuit for a plurality of fans includes a voltage input terminal, a plurality of speed control modules, and a fan tachometer. Each of the speed control modules includes a fan connector, a speed adjusting unit, and a detector switch unit. The speed adjusting unit includes a switching control unit, a voltage adjusting chip, and a variable resistor. The detector switch unit includes a first switch. The voltage input terminal connects to the input terminal of the voltage adjusting chip through the switching control unit. The output terminal of the voltage adjusting chip connects to the power pin of the fan connector. The adjusting terminal of the voltage adjusting chip connects to ground through the variable resistor, and connects to the output terminal of the voltage adjusting chip through a resistor. The detection pin of the fan connector connects to the fan tachometer through the first switch.

6 Claims, 1 Drawing Sheet

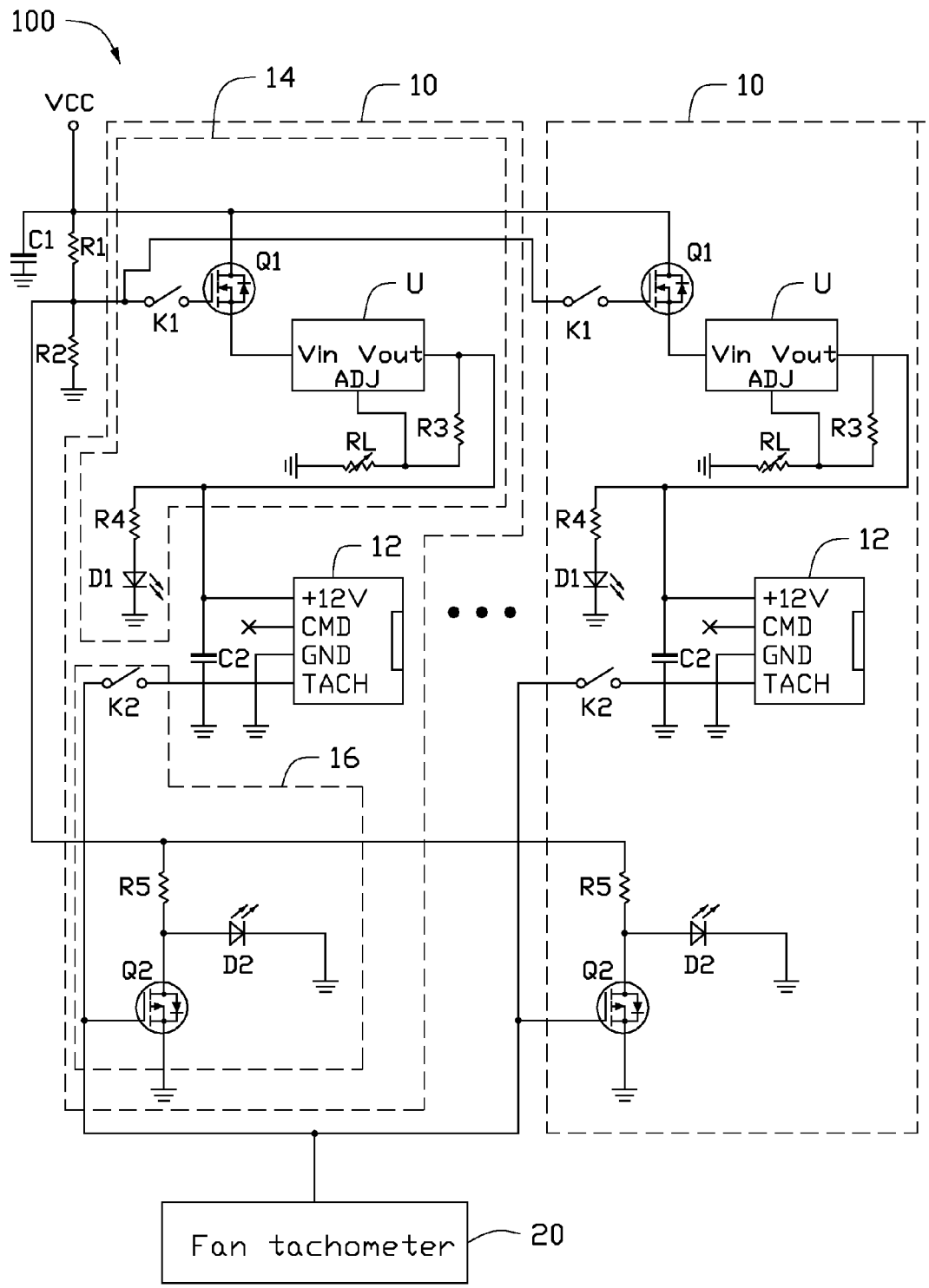

SPEED ADJUSTMENT CIRCUIT FOR A PLURALITY OF FANS

BACKGROUND

1. Technical Field

The present disclosure relates to a speed adjustment circuit for a plurality of fans.

2. Description of Related Art

In a server, system fans are required. When performing heat dissipation tests on servers, the speed of system fans has to be adjusted, in which relationships between the speed and the system noise, airflow volume, and the temperature of the components are obtained and analyzed for optimal power consumption and noise control. As a result, when a plurality of fans are deployed in a system, a plurality of devices for the adjustment and measurement of speed are necessary, increasing system costs.

BRIEF DESCRIPTION OF THE DRAWINGS

Many aspects of the present device can be better understood with reference to the following drawings. The components in the drawings are not necessarily drawn to scale, the emphasis instead being placed upon clearly illustrating the principles of the present heat dissipation apparatus and the present heat dissipation method. Moreover, in the drawings, like reference numerals designate corresponding parts throughout the several views.

The FIGURE is a circuit diagram of a preferred embodiment of a speed adjustment circuit of the present disclosure.

DETAILED DESCRIPTION

As shown in the FIGURE, a preferred embodiment of a speed adjustment circuit 100 includes a voltage input terminal VCC, two resistors R1 and R2, a capacitor C1, a plurality of speed control modules 10, and a fan tachometer 20. The number of speed control modules 10 equals or exceeds that of the system fans in the server under test, and can be changed according to demand.

Since the electronic components and their connection relationships of each of the speed control modules 10 are the same, the following descriptions focus on a single speed control module 10 for brevity.

The speed control modules 10 include a fan connector 12, a speed adjusting unit 14, and a detector switch unit 16. The fan connector 12 including four pins is utilized to connect to the connector of the corresponding system fan. The +12V pin is the power pin; the CMD pin is not connected; the GND pin is the ground pin connected to ground; and the TACH pin is the detection pin. The speed adjusting unit 14 includes a switch K1, a field effect transistor Q1, a voltage adjusting chip U (e.g. LM317 type voltage adjusting chip), two resistors R3 and R4, a variable resistor RL, and a light emitting diode D1. The detector switch unit 16 includes a switch K2, a field effect transistor Q2, a resistor R5, and a light emitting diode D2.

The voltage input terminal VCC is connected to one terminal of the resistor R1. The other terminal of the resistor R1 is connected to one terminal of the resistor R2. The other terminal of the resistor R2 is connected to ground. Resistors R1 and R2 form a voltage divider circuit. The capacitor C1 is connected to the voltage input terminal VCC and ground. The voltage input terminal VCC may receive a voltage from, for instance, directly from the motherboard of the server. The voltage input terminal VCC is connected to the drain of the field effect transistor Q1. The node between resistors R1 and R2 is connected to the gate of the field effect transistor Q1 through the switch K1. The source of the field effect transistor Q1 is connected to the input terminal Vin of the voltage adjusting chip U. The output terminal Vout of the voltage adjusting chip U is connected to one terminal of the resistor R3. The other terminal of the resistor R3 is connected to one terminal of the variable resistor RL. The other terminal of the resistor RL is grounded. The output terminal Vout of the voltage adjusting chip U is connected to one terminal of the resistor R4. The other terminal of the resistor R4 is connected to the anode of the light emitting diode D1. The cathode of the light emitting diode D1 is grounded. The output terminal Vout is further connected to the +12V power pin of the fan connector 12. The adjusting terminal ADJ of the voltage adjusting chip U is connected to the node between the resistor R3 and the variable resistor RL. In this embodiment, the switch K1 and the field effect transistor Q1 jointly form a switching control unit for controlling the application of voltage signals to the voltage adjusting chip U. However, in other embodiments, the design can be changed by, for instance, utilizing a relay to control the voltage signals applied to the voltage adjusting chip U.

The detection pin TACH of the fan connector 12 is connected to one terminal of the switch K2. The other terminal of the switch K2 is connected to the fan tachometer 20 and the gate of the field effect transistor Q2. The node between the two resistors R1 and R2 is connected to one terminal of the resistor R5. The other terminal of the resistor R5 is connected to the drain of the field effect transistor Q2 and the anode of the light emitting diode D2. The cathode of the light emitting diode D2 is grounded. The source of the field effect transistor Q2 and the cathode of the light emitting diode D2 are grounded. In other embodiments, the resistors R1, R2, and the capacitor C1 can be omitted and the voltage input terminal VCC can be connected to the switch K1 directly.

When using the speed adjustment circuit 100, the connector of the plurality of system fans of the server are respectively received in the fan connector 12 of the speed control modules 10, and switches K1 and K2 of all the speed control modules 10 are opened. After turning on the server, the voltage input terminal VCC receives a voltage signal from the motherboard of the server. During testing of one system fan, the switch K1 corresponding to the system fan is closed. Consequently, the corresponding field effect transistor Q1 is turned on so that the corresponding voltage adjusting chip U becomes operative, applying voltage to the system fan under test. Concurrently, the corresponding light emitting diode D1 is turned on to indicate that the system fan under test is operative (in other embodiments, the light emitting diode D1 can be omitted). After closing the switch K2 corresponding to the system fan, the fan tachometer 20 displays the speed of the system fans under test instantaneously. Concurrently, the corresponding field effect transistor Q2 is turned off and the corresponding light emitting diode D2 turned on to indicate that the speed shown by the fan tachometer 20 is the speed of the system fan corresponding to the corresponding light emitting diode D2 (in other embodiments, the light emitting diode D2 can be omitted). Consequently, the voltage input to the system fans under test can be changed by adjusting the variable resistor RL, which further adjusts the speed of the system fans. When the speed displayed on the fan tachometer 20 achieves a predetermined value, the corresponding switches K1 and K2 can be opened to complete adjustment of the system fans under test. Similarly, the disclosed methods can be employed to adjust the speed of other system fans.

While the invention has been described by way of example and in terms of preferred embodiment, it is to be understood that the invention is not limited thereto. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A speed adjustment circuit for adjusting the speed of a plurality of fans, the speed adjustment circuit comprising:
   a voltage input terminal;
   a plurality of speed control modules, wherein each of the speed control modules comprises:
      a fan connector;
      a speed adjusting unit including a switching control unit, a voltage adjusting chip, and a variable resistor; and
      a detector switch unit including a first switch;
      wherein the voltage input terminal connects to the input terminal of the voltage adjusting chip through the switching control unit, the output terminal of the voltage adjusting chip connects to the power pin of the fan connector; the adjusting terminal of the voltage adjusting chip connects to ground through the variable resistor and connects to the output terminal of the voltage adjusting chip through a resistor; and
   a fan tachometer, wherein the detection pin of the fan connector connects to the fan tachometer through the first switch.

2. The speed adjustment circuit of claim 1, further comprising two resistors, the switching control unit including a second switch and a field effect transistor, wherein the voltage input terminal connects to ground through the two resistors connected in series and connects to the drain of the field effect transistor, the gate of the field effect transistor is connected to the node between the two resistors through the second switch, the source of the field effect transistor connects the input terminal of the voltage adjusting chip, the field effect transistor is turned on when high potential is applied to the gate of the field effect transistor.

3. The speed adjustment circuit of claim 2, wherein the voltage input terminal further connects to ground through a capacitor.

4. The speed adjustment circuit of claim 1, wherein the power pin of the fan connector further connects to ground through a capacitor.

5. The speed adjustment circuit of claim 1, wherein the speed adjusting unit further includes a light emitting diode, the output terminal of the voltage adjusting chip connects to the anode of the light emitting diode through a resistor while the cathode of the light emitting diode connects to ground.

6. The speed adjustment circuit of claim 1, wherein the detector switch unit further includes a field effect transistor and a light emitting diode, the detection pin of the fan connector connects to the gate of the field effect transistor through the first switch, the drain of the field effect transistor connects to the voltage input terminal through a resistor and connects to the anode of the light emitting diode, the cathode of the light emitting diode connects to ground, the source of the field effect transistor connects to ground, the field effect transistor is turned off when a high potential is applied to the gate of the field effect transistor.

* * * * *